United States Patent [19]
Betts et al.

[11] Patent Number: 4,555,790
[45] Date of Patent: Nov. 26, 1985

[54] DIGITAL MODEM HAVING A MONITOR FOR SIGNAL-TO-NOISE RATIO

[76] Inventors: William L. Betts, 115 Bock Ciega Dr., Madeira Beach, Fla. 33541; Kenneth Martinez, 6293 109th Ave. N., Pinellas Park, Fla. 33565

[21] Appl. No.: 509,716
[22] Filed: Jun. 30, 1983
[51] Int. Cl.[4] ............................................... H03C 5/00
[52] U.S. Cl. ...................................... 375/39; 375/10; 328/165
[58] Field of Search ...................... 375/10, 39, 51, 57, 375/58, 80, 99, 101; 328/162, 168, 165; 329/110, 112; 371/4, 5

[56] References Cited
U.S. PATENT DOCUMENTS 3,693,100  9/1972  Brown et al. .......................... 375/34
3,889,108  6/1975  Cantrell ................................ 328/165
3,978,407  8/1976  Forney, Jr. et al. .................. 375/39
4,311,963  1/1982  Watanabe et al. .................. 328/165
4,447,910  5/1984  Smith et al. ............................ 375/99
4,458,355  7/1984  Motley et al. ......................... 375/99

Primary Examiner—Robert L. Griffin
Assistant Examiner—Stephen Chin

[57] ABSTRACT

The present invention pertains to a digital modem utilizing QAM-type modulation having a signal-to-noise monitor which utilizes some of the components of a standard modem without interfering with its normal operation. The monitor averages the absolute value of the difference between the signal received by the modem and the ideal signal as represented on a typical signal constellation. In order to minimize the effect of phase and amplitude errors the monitor only handles the innermost signals of the constellation and ignores all the other signals.

4 Claims, 4 Drawing Figures

DIGITAL MODEM HAVING A MONITOR FOR SIGNAL-TO-NOISE RATIO

OBJECTIVES AND SUMMARY OF THE INVENTION

In view of the above considerations the objective of the present invention is to provide a device for direct monitoring of the signal-to-noise ratio in a digital modem by using some of the standard components of the modem but without interfering with the modem's normal operation.

Another objective is to provide a device which uses relatively simple, easily available components.

Other objectives and advantages of the invention shall become clear during the course of the preferred description of the invention.

The modem according to this invention is adapted to receive QAM-type signals from a digital communication network, said signals being represented by a signal constellation, the modem comprising means for determining the ideal signals corresponding to the received signals, and means for generating noise signals, said noise signals being the difference between said ideal and said received signals, means for generating the rms value of said noise signals and means for determining the signal-to-noise ratio. Since for signals located relatively far from the origin of said signal constellation the difference between the received and the ideal signals is due to noise, as well as phase and amplitude errors induced by the communication network, the monitoring means is adapted to respond only to the innermost signals, i.e. signals located relatively close to the origin, where the effects of said phase and amplitude errors are negligible.

DESCRIPTION OF THE PREFERRED EMBODIMENT

Figure 1:
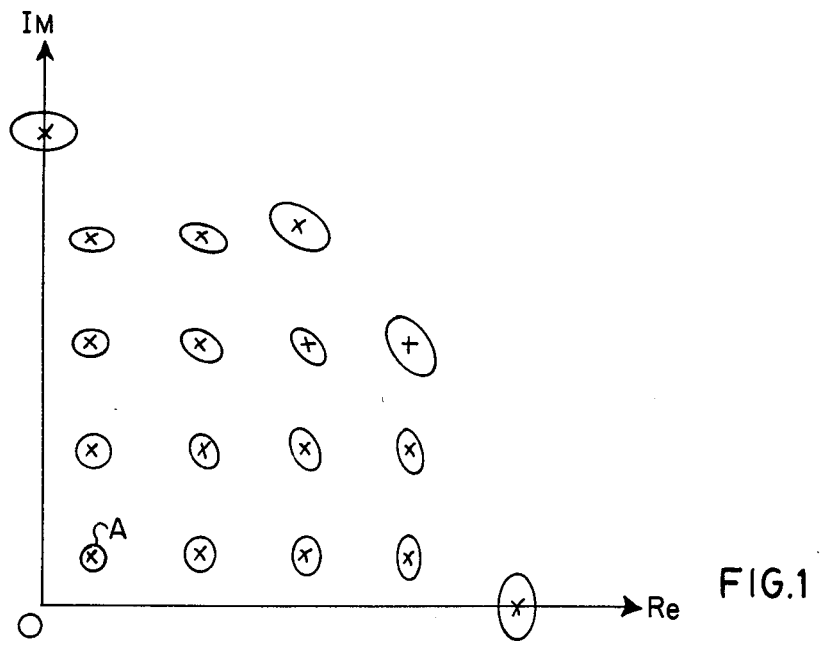
FIG. 1 shows the first quadrant of the signal constellation associated with a typical 64 point QAM-type modem.

The invention shall now be described in reference to a 14400 b/s 64-point QAM-type digital modem, it being understood that the device may be easily adapted to other digital modems by one skilled in the art. The typical constellation of the signals by the modem of the type described above over a standard communications line is shown in FIG. 1. Actually only the first quadrant is shown since the other three quadrants would obviously look similar. The ideal points for each possible signal have been marked by an X and the closed oval loops drawn around each X delineates the signal space of a typical signal received by a modem of the type described above for that particular ideal signal X. These loops are due to phase jitter, frequency jitter, amplitude modulation and noise. It should be noted that the area of the loop around each point X increases as the radial component of X, i.e. its distance increases from the origin 0. Furthermore the eccentricity of these loops also increases with the radial component due to the increased effect of the phase jitter. On the other hand points near the origin, and especially the innermost points such as point A are surrounded by almost circular shapes. This indicates that the errors in the received signals corresponding to the innermost points are predominantly due to noise. Therefore, a signal-to-noise determination for the digital modem may be accomplished by analyzing only the signals corresponding to the innermost points.

Figure 2:
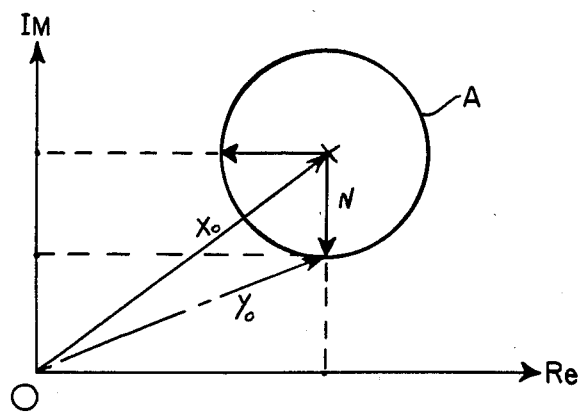
FIG. 2 is an enlarged portion of FIG. 1 showing the innermost point.

In other words if a signal Yo is received corresponding to an ideal signal Xo, where Yo is an innermost signal A, the error signals other than noise N may be ignored so that signals Xo, Yo and N are related by $$N = Y_o - X_o \text{ (See FIG. 2)},$$

One great advantage in modems using QAM or PSK-type modulation is that Xo and therefore its rms value is known. If, for example when a Yo is received which is in signal space A, it is inherently obvious that the ideal signal Xo has been sent. Therefore in a QAM or PSK modem S/N may be readily calculated. Generally the signal-to-noise ratio is defined as $$(S/N) = 20 \log (x/n);$$

where x is the rms value of the ideal signal X and n is the rms value of the noise N.

A further approximation may be made by assuming that for small variations of N with respect to Y, the rms value n of N taken over Y samples is $$n = (\sum_k |N|)/k.$$

Figure 3:
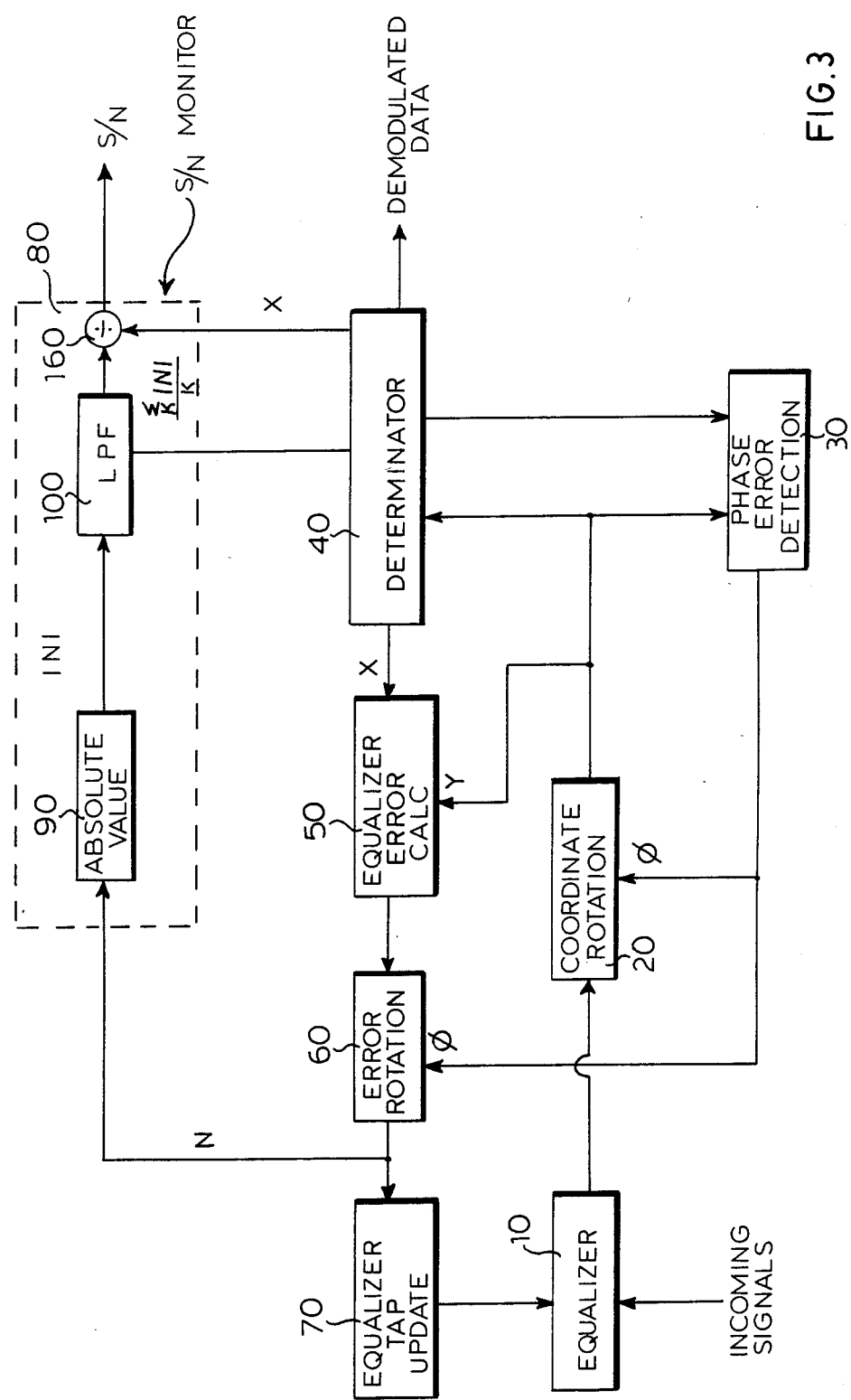
FIG. 3 shows the subject device incorporated in a phase correction loop of a digital modem.

One way of implementing the signal-to-noise ratio monitor is shown in FIG. 3. In this figure incoming signals are fed into an equalizer 10 which feeds the equalized signals into a coordinate rotation circuit 20. Circuit 20 rotates the signals by an angle $\phi$ provided by phase error detection circuit 30 which is designed to eliminate phase errors. Details of the error detection circuit are disclosed in the commonly assigned Patent Application Ser. No. 407,451 filed on Aug. 12, 1982 which is hereby incorporated by reference.

Briefly, the rotated signals Y are also fed into a determinator circuit 40 which determines the ideal signals X corresponding to said signals Y. The determinator generates a complex constant for each signal Y and sends it to the phase error detection circuit 30. The determinator circuit also outputs demodulated data in accordance with the ideal signals X.

At the same time equalizer error calculation circuit 50 calculates the difference D between the incoming signals Y and the ideal signals X. As it was pointed out earlier, for the innermost points, X=Xo, this difference is effectively a noise signal, i.e. D=N. The difference D is fed into an error rotation circuit 60 which is provided to eliminate the effect of the coordinate rotation circuit 20, by rotating the difference D by an angle $\phi$. The output of circuit 60 is fed into equalizer tap update circuit 70 and is in phase with the output of equalizer 10. The equalizer tap update circuit 70 is used to adjust the taps of equalizer 10.

Figure 4:
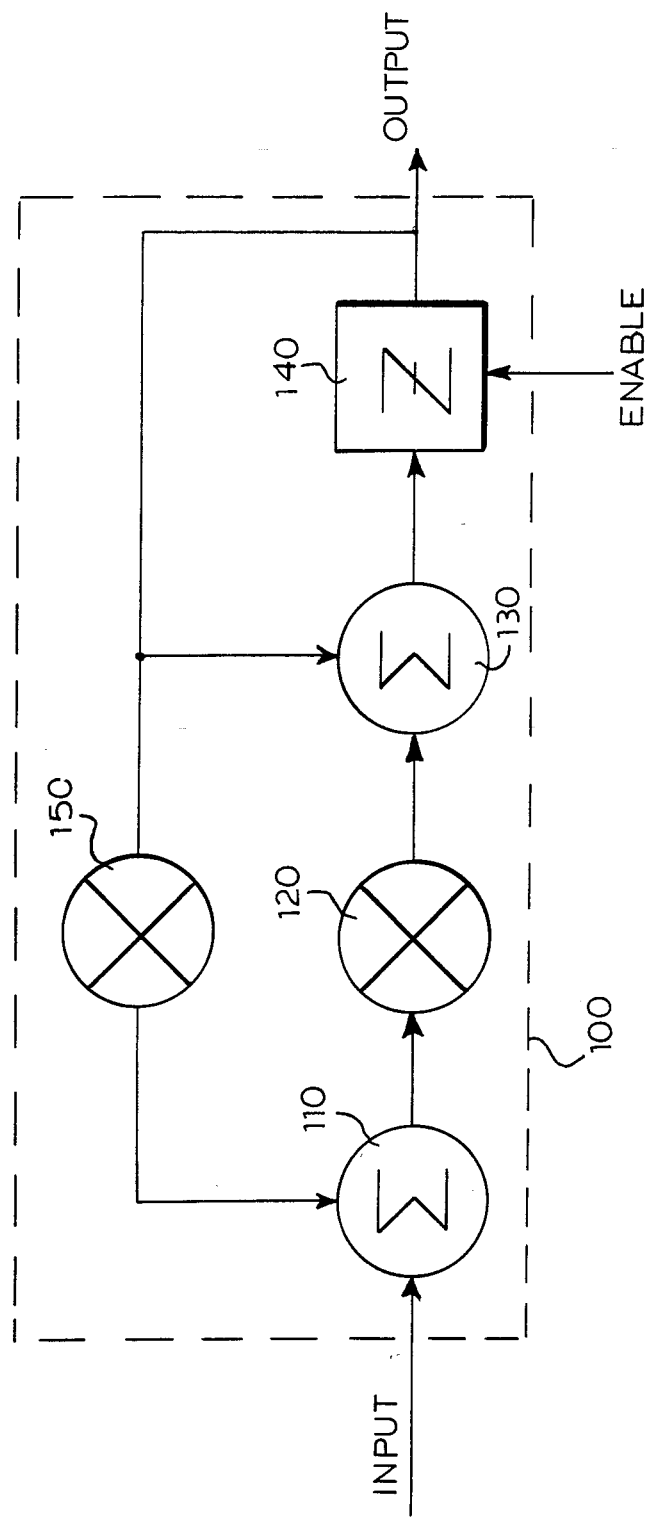
FIG. 4 shows a digital low pass filter used in the device.

The signal-to-noise ratio monitor circuit 80 comprises an absolute value circuit 90 and a low-pass filter 100. The absolute value circuit 90 generates the absolute value of the output D of circuit 60. The low pass filter 100 is a standard digital filter with the components shown in FIG. 4.

The input of the filter 100 is connected to a first adder 110 and from there the signal is passed through a first multiplier 120, a second adder 130, and an integrator 140. The output of the integrator provides the output of the filter 100, and is also fed back to second adder 130 and via second multiplier 150 to first adder 110. The multipliers multiply their respective inputs by scaling factors. These factors are usually powers of 2 so that the multiplication can be easily accomplished by mere binary shifting of the inputs. The integrator 140 is normally a digital memory device and it is operational only when it gets an ENABLE signal. This low-pass filter 100 is usually referred to as a leaky integrator and its output does not overflow, nor does it return to zero with a zero input. Thus the filter may be used to obtain an output which is the average of the input signals taken over a period of time which is equal to the time constant of the filter.

The net effect of combining the absolute value circuit 90 with low-pass filter 100 is to produce an output which is the average of the absolute value of the input. The ENABLE line of the low-pass filter 100 is connected to the determinator 40 which activates it only when an incoming signal is Yo corresponding to Xo, i.e, the filter 100 is active only when D=N. Therefore the output n of circuit 80 is $$n = (\sum_k |N|)/k$$

which is approximately the desired rms value of the noise. This value is then fed into divider 160 which also receives an input x from determinator 40 to generate the signal-to-noise ratio X/N. One skilled in the art will appreciate the fact that the monitor presented herein performs its function without interfering in any way with the normal functioning of the modem.

The circuit presented herein accomplishes all the desired objectives of the invention. Other configurations may be made without departing from the scope of the invention as defined in the appended claims.

What is claimed is:

1. A modem with a signal-to-noise ratio monitor in a digital communication system utilizing QAM- type modulation adapted to receive signals which can be represented as a signal constellation, comprising:

means for determining ideal signals each one of said ideal signals corresponding to a received signal, and;

enabling means for enabling 2 monitoring means only when said received signals are the innermost signals with respect to the origin of said signal constellation;

said monitoring means comprising: means for generating a noise signal for said received signals, said noise signal being equal to the difference between said received signals and the corresponding ideal signals; and means for generating the rms value of said noise signals.

2. The modem of claim 1 wherein said enabling means are a part of said determining means.

3. The modem of claim 1 wherein said rms value generating means comprise;

an absolute value means; and a digital low-pass filter.

4. The modem of claim 3 wherein said digital low-pass filter is adapted to be enabled by said enabling means.

* * * * *

UNITED STATES PATENT AND TRADEMARK OFFICE
CERTIFICATE OF CORRECTION

PATENT NO. : 4,555,790

DATED : November 26, 1985

INVENTOR(S) : Betts et al.

It is certified that error appears in the above-identified patent and that said Letters Patent is hereby corrected as shown below:

Column 1, after the TITLE insert the following:
--FIELD OF INVENTION
    This invention relates to a digital modem with a device for monitoring the signal-to-noise ratio of a communication line to said modem.

BACKGROUND OF THE INVENTION
    Digital data can be sent from one location to another via data communication lines. When this is done the parties sending or receiving the data have no control over those lines. It is well known that a noisy communication line will produce errors in the transmitted data. Therefore it would be able to monitor the quality of the communication line used during a particular transmission by its signal-to-noise ratio (S/N). Theoretical expressions for S/N have been developed for different types of line (i.e. twisted pairs of underground wires, overhead cables,) and different types of communication schemes (i.e. FSK, PSK, QAM). However such expression gave users only an indication of the range of the expected S/N from a particular combination of communication line and scheme

UNITED STATES PATENT AND TRADEMARK OFFICE
CERTIFICATE OF CORRECTION

PATENT NO. : 4,555,790              Page 2 of 2

DATED : November 26, 1985

INVENTOR(S) : Betts et al.

It is certified that error appears in the above-identified patent and that said Letters Patent is hereby corrected as shown below:

rather than acutal signal-to-noise-ratios. Some modems have been built which chave a signal-to-noise monitor, however such units usually have to perform very complex calculations and therefore by necessity the modems comprise additional components, such as an external processor.--

In Claim 1, line 8, change "2" to --a--.

Signed and Sealed this

Fifteenth Day of April 1986

[SEAL]

Attest:

DONALD J. QUIGG

Attesting Officer      Commissioner of Patents and Trademarks